United States Patent [19]
Mulhauser et al.

[11] Patent Number: 5,992,309
[45] Date of Patent: Nov. 30, 1999

[54] DEVICE FOR DRYING FOODS

[75] Inventors: Paul J. Mulhauser, New York, N.Y.;
Erika Elmuts, Carlisle, Mass.;
Elizabeth Erin O'Halloran, Acton, Mass.; Mario M. Protano, Watertown, Mass.; Jonathan C. Roche, Florence, Mass.; Clinton N. Tate, Boise, Id.

[73] Assignee: General Housewares Corp., Terre Haute, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,000

[22] Filed: Nov. 26, 1997

[51] Int. Cl.⁶ .............................. A47J 37/10; A47J 43/04; F26B 17/24; F26B 17/30
[52] U.S. Cl. .................................. 99/495; 34/58; 99/511; 210/360.1; 494/60
[58] Field of Search ............................. 99/495, 511–513, 99/516, 479, 485; 34/8, 58; 210/360.1, 380.1, 784, 781; 494/11, 37, 46, 60, 62, 63, 84; 241/282.1, 169; 426/443, 478, 601; 366/234, 601

[56] References Cited

U.S. PATENT DOCUMENTS

| | | |
|---|---|---|
| D. 260,346 | 8/1981 | Lebowitz . |
| D. 328,551 | 8/1992 | Kong . |
| D. 376,063 | 12/1996 | Bull et al. . |
| 3,587,692 | 6/1971 | Nelson ................................ 241/169 X |
| 3,612,532 | 10/1971 | Strongin . |
| 3,718,045 | 2/1973 | Dutch . |
| 3,753,297 | 8/1973 | Mantelet . |
| 3,837,091 | 9/1974 | Meyer . |
| 3,885,321 | 5/1975 | Fouineteau . |
| 3,933,315 | 1/1976 | Popeil ..................................... 241/166 |
| 4,090,310 | 5/1978 | Koff . |
| 4,103,432 | 8/1978 | Dieterich et al. ............................ 34/58 |
| 4,114,286 | 9/1978 | Bingham . |
| 4,189,850 | 2/1980 | Dieterich et al. ............................ 34/58 |
| 4,209,916 | 7/1980 | Doyel . |
| 4,309,840 | 1/1982 | Kulesza et al. . |
| 4,643,692 | 2/1987 | Magers . |
| 4,702,162 | 10/1987 | Sontheimer et al. . |
| 4,967,970 | 11/1990 | Michel ................................... 241/169 |
| 5,054,209 | 10/1991 | Koff . |
| 5,064,535 | 11/1991 | Hsu . |
| 5,156,084 | 10/1992 | Lin . |
| 5,317,964 | 6/1994 | Prudhomme .............................. 99/495 |
| 5,562,025 | 10/1996 | Bull et al. . |
| 5,608,938 | 3/1997 | Baschenis . |

FOREIGN PATENT DOCUMENTS

| | | |
|---|---|---|
| 743906 | 4/1933 | France . |
| 1259498 | 3/1961 | France . |
| 351731 | 3/1961 | Switzerland . |
| 353509 | 5/1961 | Switzerland . |
| 405485 | 2/1934 | United Kingdom . |
| 2004020 | 3/1979 | United Kingdom . |

OTHER PUBLICATIONS

Photographs of Playskool "Pop 'n Spin Top" and packaging© 1991, 1993 therefore.
Photographs of Choral Top and Back to Basics Toys Catalog, p. 7 illustrating the Choral Top, undated.
Photographs of Winnie the Pooh toy, undated.

*Primary Examiner*—Timothy F. Simone
*Attorney, Agent, or Firm*—Emrich & Dithmar

[57] ABSTRACT

A device for drying food includes a bowl having a bottom wall and a sidewall terminating in a top edge, a cover removably connected to the top edge of the bowl and a perforated basket disposed in the bowl and rotatable relative thereto coaxially therewith, and a drive assembly coupled to the basket for effecting rotation thereof. The drive assembly includes a linearly reciprocating handle structure with a screw shaft engageable with a nut coupled to the basket for converting the reciprocating movement of the handle structure to rotary motion of the basket.

18 Claims, 10 Drawing Sheets

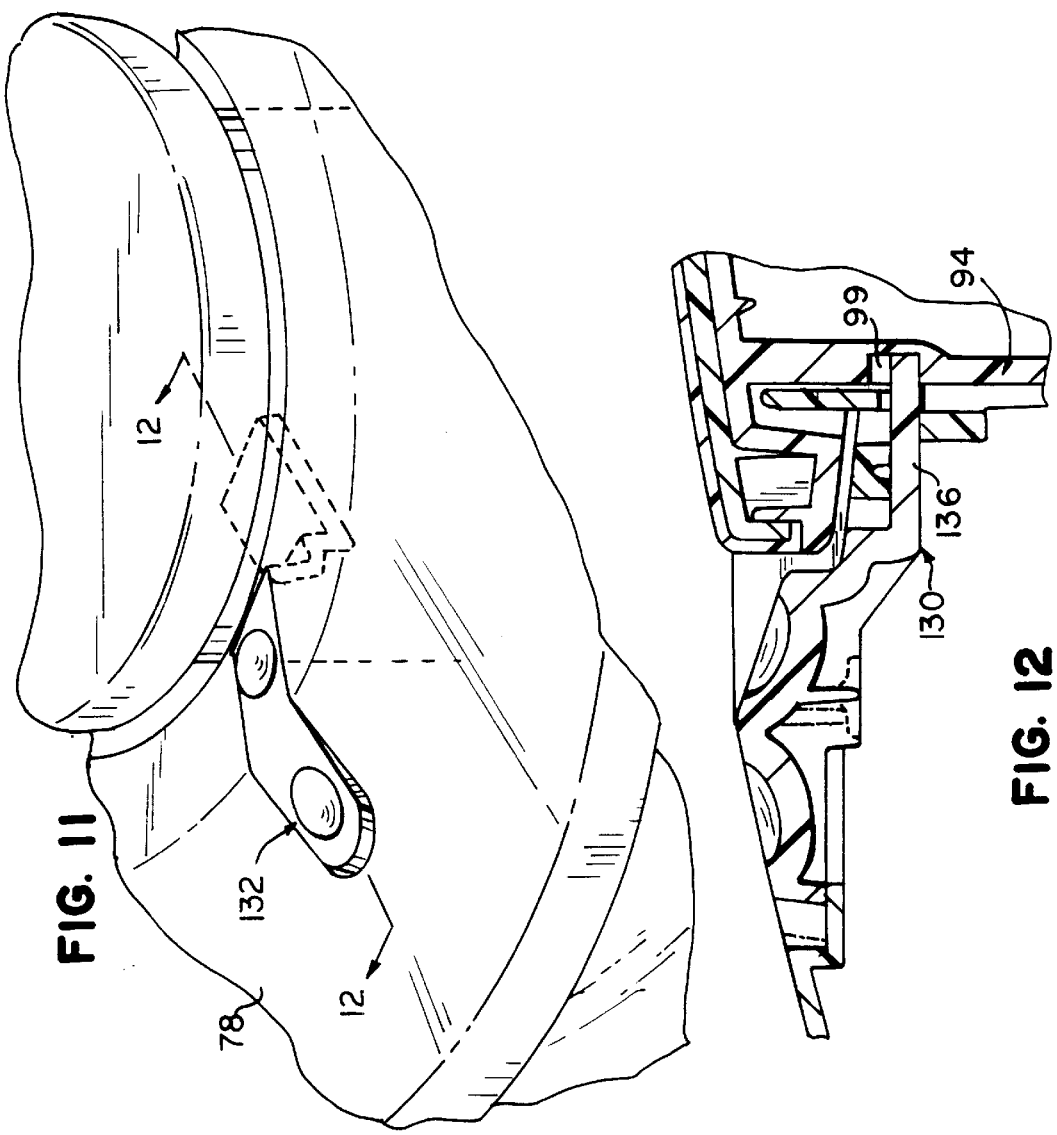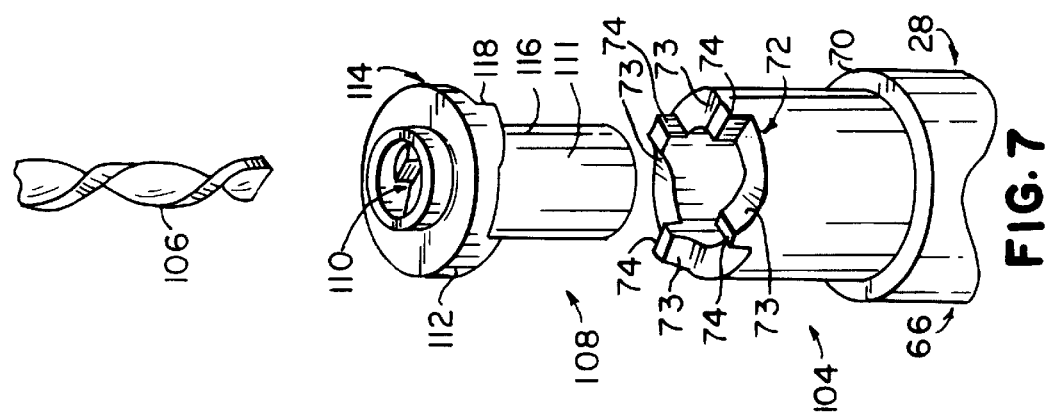

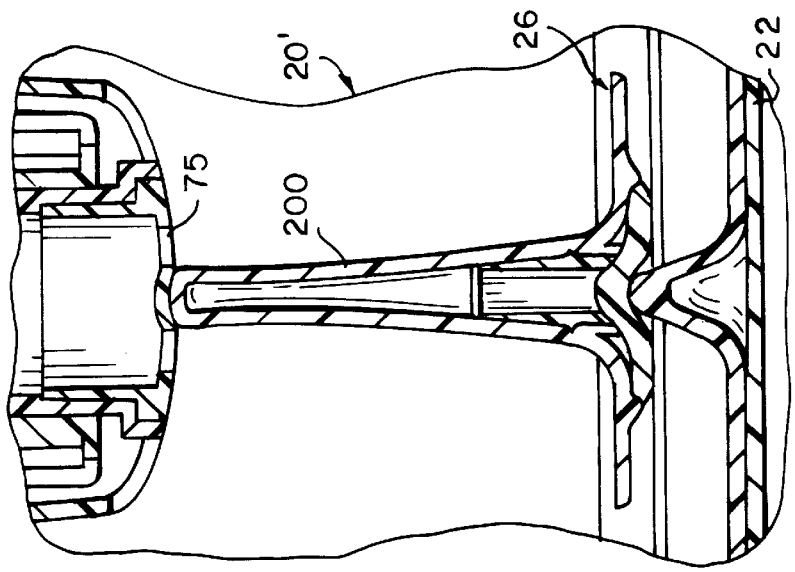
FIG. 19
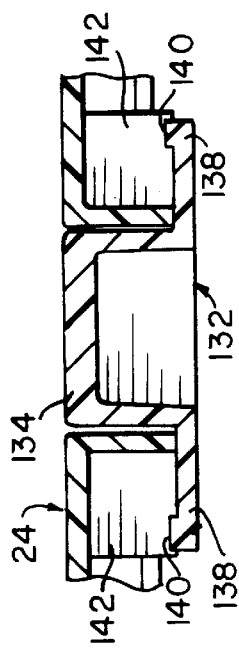
FIG. 14
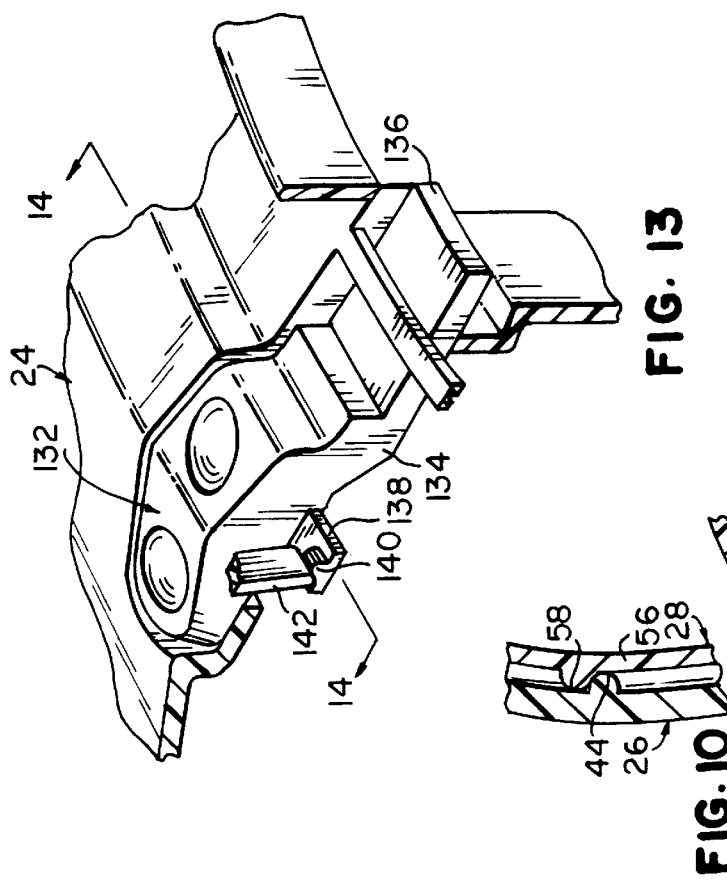
FIG. 13
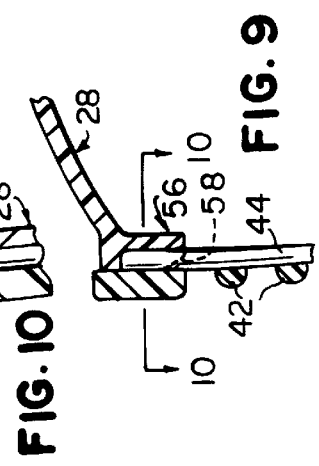
FIG. 10
FIG. 9

DEVICE FOR DRYING FOODS

BACKGROUND OF THE INVENTION

1. Field of the Invention

This invention relates to devices for drying wet food, such as salad spinners.

2. Description of the Prior Art

Various devices for drying food, such as salad spinners, are known. These salad spinners usually include a bowl, a cover connected to the bowl, a perforated basket, and a crank-type actuator coupled to the basket for spinning the same. These prior spinners, however, are not always stable when cranked, often moving laterally during the cranking operation, which can cause the spinner to fall off its support to the floor. These falls may cause the spinner to be damaged or food contents thereof to be spilled. To safely use the spinner, a user must often hold down the spinner with one hand and crank with the other hand.

Additionally, the crank mechanisms of these spinners have a knob or other portion permanently disposed on and projecting laterally from the top of the cover. These projecting knobs can be damaged and take up space when not in use, making storage difficult.

SUMMARY OF THE INVENTION

It is a general object of the invention to provide an improved device for drying food which avoids the disadvantages of prior devices while affording additional structural and operating advantages.

An important feature of the invention is the provision of a device having a pumping actuator to rotate a basket relative to a bowl, which requires little force to operate and minimizes fatigue in use.

A further feature of the invention is the provision of device of the type set forth which can be used with ease and convenience.

In connection with the foregoing feature, a further feature of the invention is the provision of device of the type set forth, which can be operated with one hand while the bowl remains stationary in use.

Certain ones of these and other features of the invention may be attained by providing a device for drying food which includes a bowl having a bottom wall and a sidewall terminating in a top edge, a cover removably connected to the top edge of the bowl, a perforated basket disposed in the bowl and rotatable about an axis and a drive assembly carried by the cover and coupled to the basket for effecting rotation thereof. The drive assembly includes a linearly reciprocating handle structure and a conversion mechanism for converting reciprocating movement of the handle structure to rotary motion of the basket.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 7 is a fragmentary, exploded perspective view of a portion of the drive assembly of FIG. 5;

FIG. 9 is an enlarged, fragmentary, sectional view of the portions designated 9 in FIG. 3;

FIG. 10 is a fragmentary, sectional view taken generally along the line 10—10 of FIG. 9;

FIG. 11 is an enlarged, fragmentary, perspective view of the device of FIG. 1, illustrating the locking mechanism;

FIG. 12 is a sectional view taken generally along line 12—12 of FIG. 11;

FIG. 13 is a fragmentary, perspective view of the device of FIG. 1 illustrating the locking mechanism;

FIG. 14 is a sectional view taken generally along the line 14—14 of FIG. 13;

FIG. 19 is a fragmentary, sectional view illustrating an alternative embodiment of the basket.

DETAILED DESCRIPTION OF THE PREFERRED EMBODIMENTS

Figure 1:
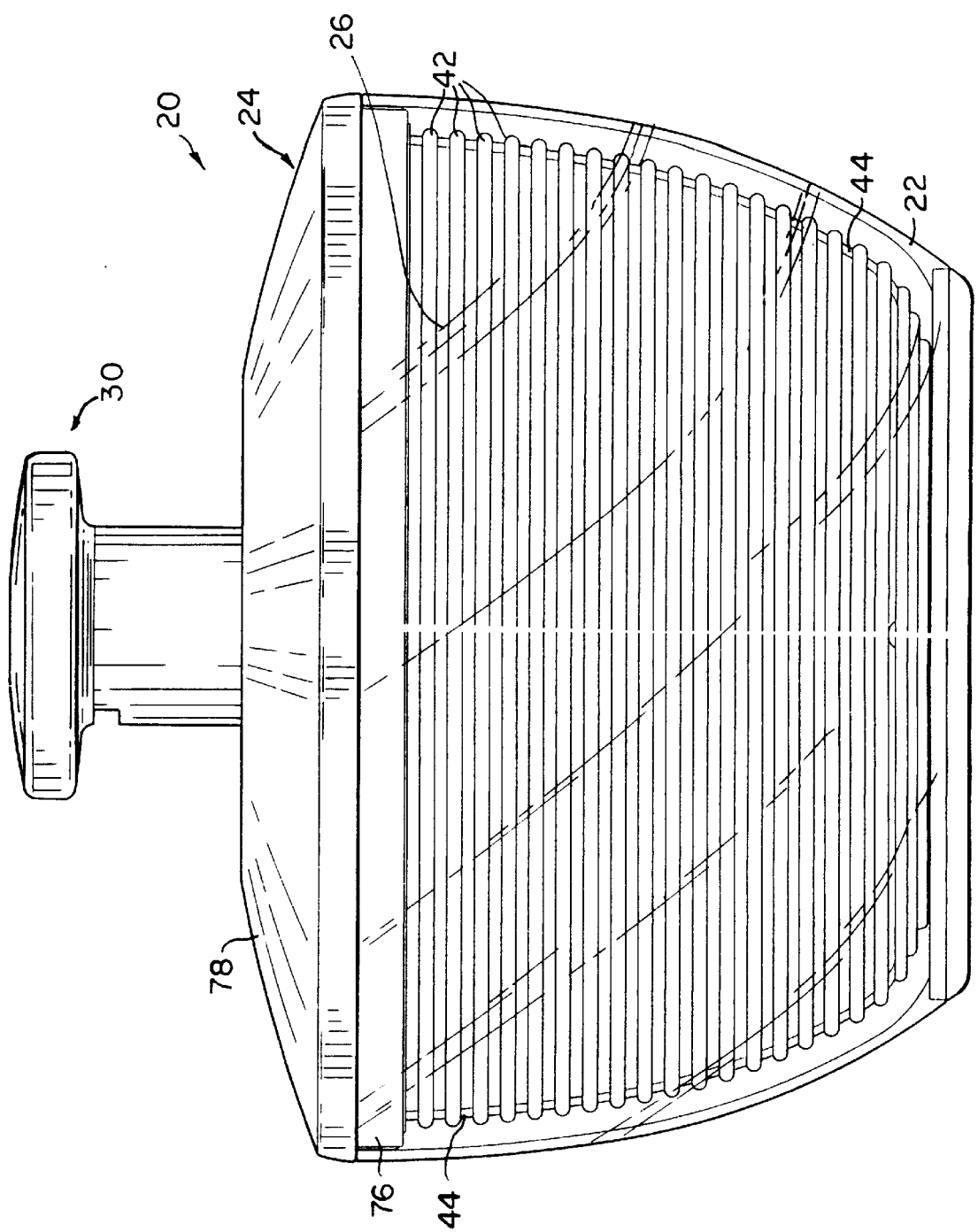
FIG. 1 is a side elevational view of the device for drying food of the present invention, with the handle in its raised position.
Figure 2:
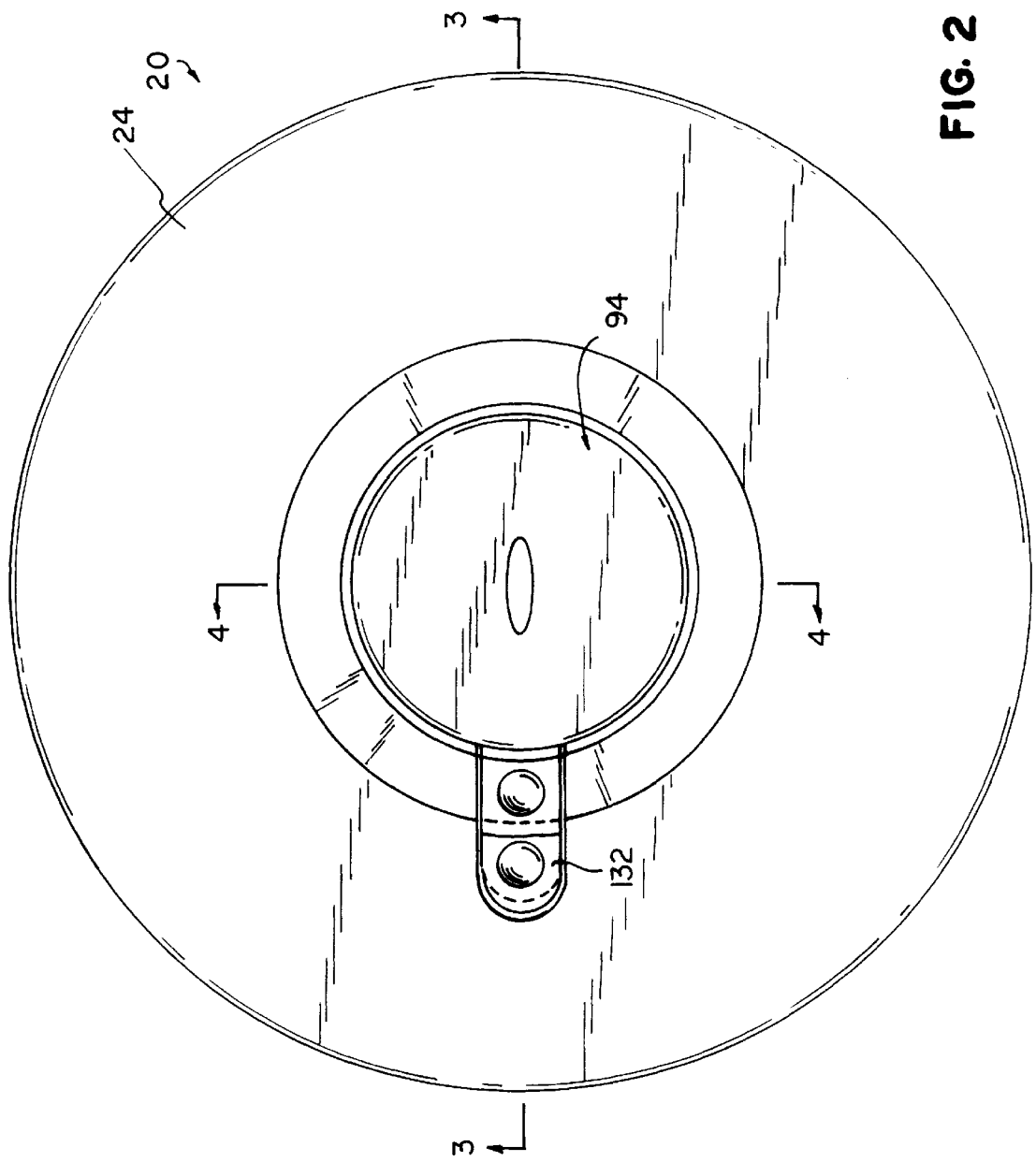
FIG. 2 is a top plan view of the device of FIG. 1.
Figure 3:
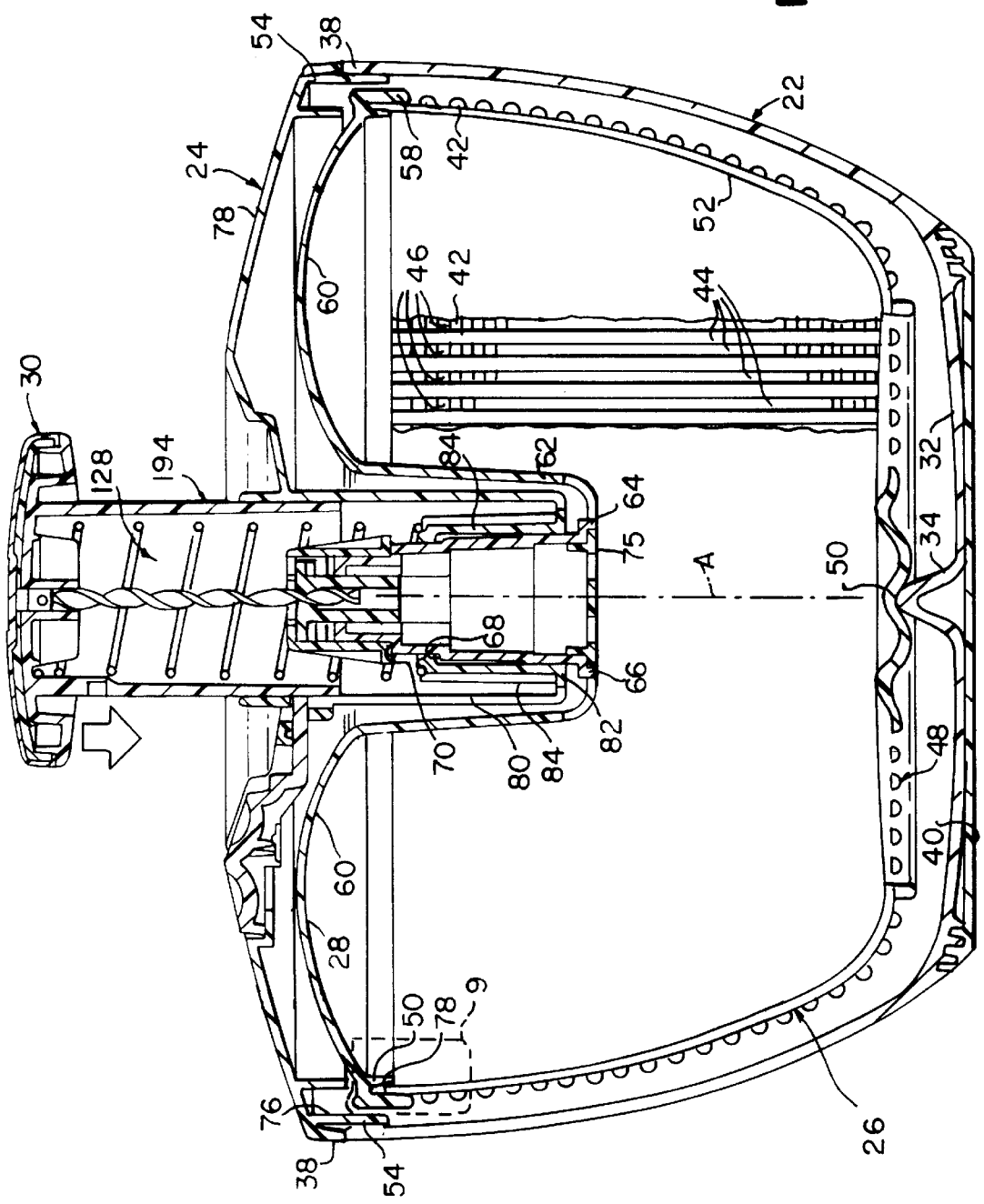
FIG. 3 is a sectional view taken generally along lines 3—3 of FIG. 2.
Figure 15:
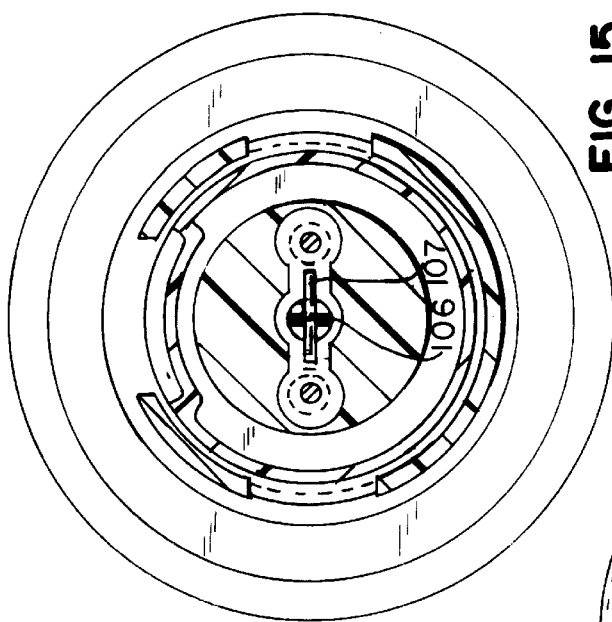
FIG. 15 is a sectional view taken generally along the line 15—15 of FIG. 4.

Referring to FIGS. 1–3, a device for drying food, such as a salad spinner 20, is provided. The salad spinner 20 generally includes a bowl 22, a cover 24 for the bowl 22, a perforated basket 26 disposed in the bowl 22, a lid 28 for the basket 26 and a drive assembly 30 for rotating the perforated basket 26.

The bowl 22 is circular in shape and, as seen in FIG. 3, has a central vertical axis A and a bottom wall 32 having a cone-shaped projection 34 in its center. The bowl 22 also includes a sidewall 36 terminating in a top edge 38 and a foot 40 connected to the bottom wall 32 and preferably made of a non-slip material.

Figure 8:
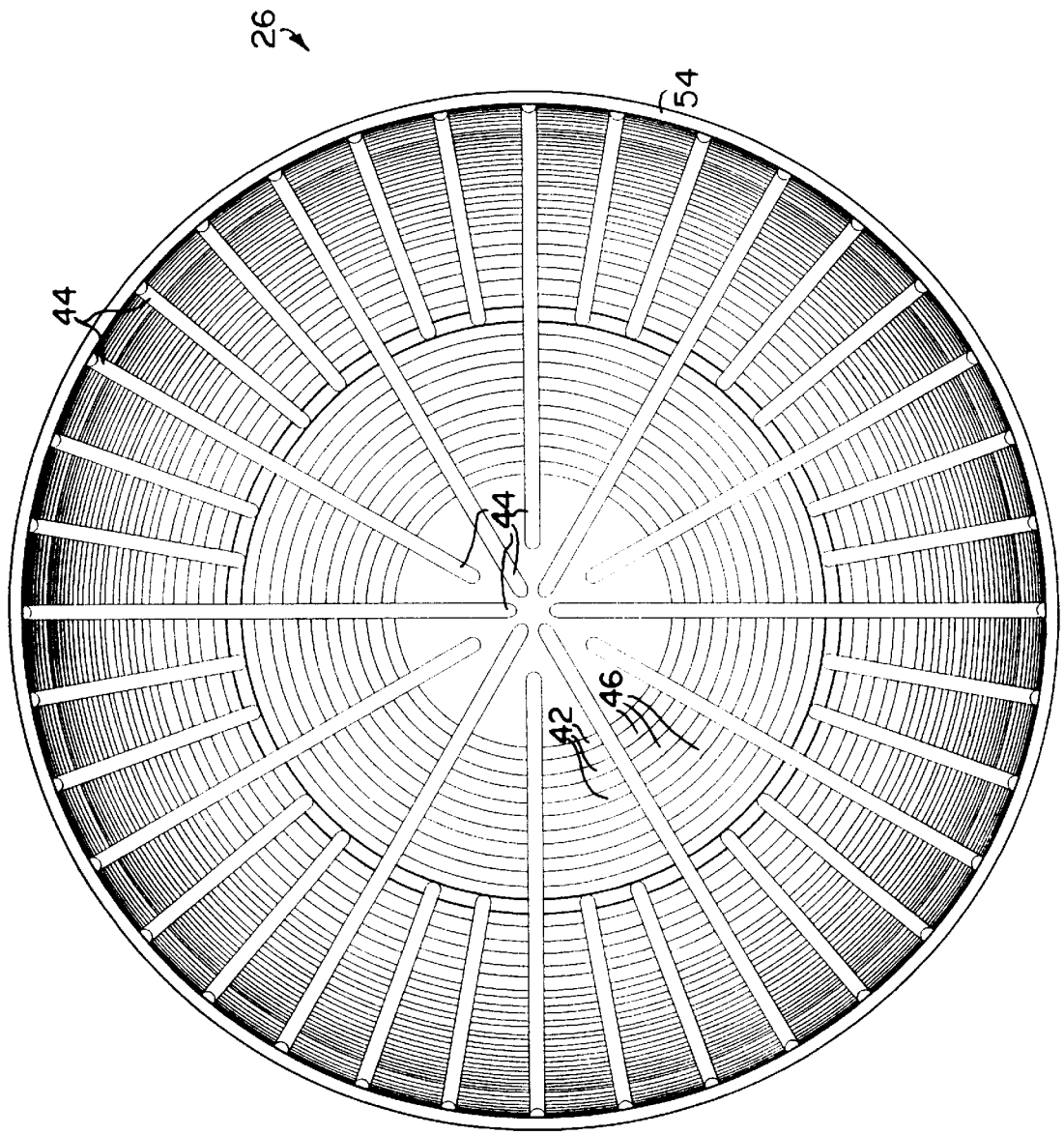
FIG. 8 is a top plan view of the perforated basket of the present invention.

The basket 26, as best seen in FIGS. 3 and 8, includes a plurality of latitudinal, coaxial circular ribs 42 connected by a plurality of longitudinal ribs 44 of various lengths. The ribs 42 and 44 cooperate to define a plurality of various sized, generally rectangular apertures 46. The basket 26, as seen in FIG. 3, also includes a bottom 48 having a cone-shaped projection 50 at its center which sits atop cone-shaped projection 34 to form a rotational bearing. The ribs 42 and 44 together form a sidewall 52 terminating at an upper edge 54.

The lid 28, as best seen in FIGS. 3, 9, and 10 includes a cylindrical peripheral sidewall 56 having a plurality of ribs 58 projecting outwardly therefrom. Referring to FIG. 3, diametrically opposed pairs of the ribs 58 cooperate to provide a friction fit with the upper edge 54 of the basket 26.

Figure 16:
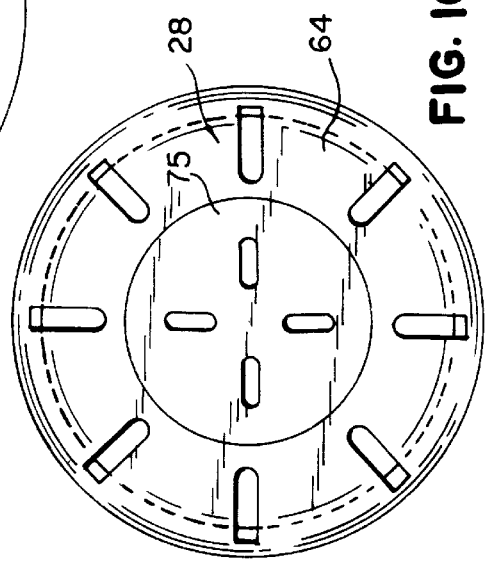
FIG. 16 is a bottom plan view taken generally along line 16—16 of FIG. 4.
Figure 5:
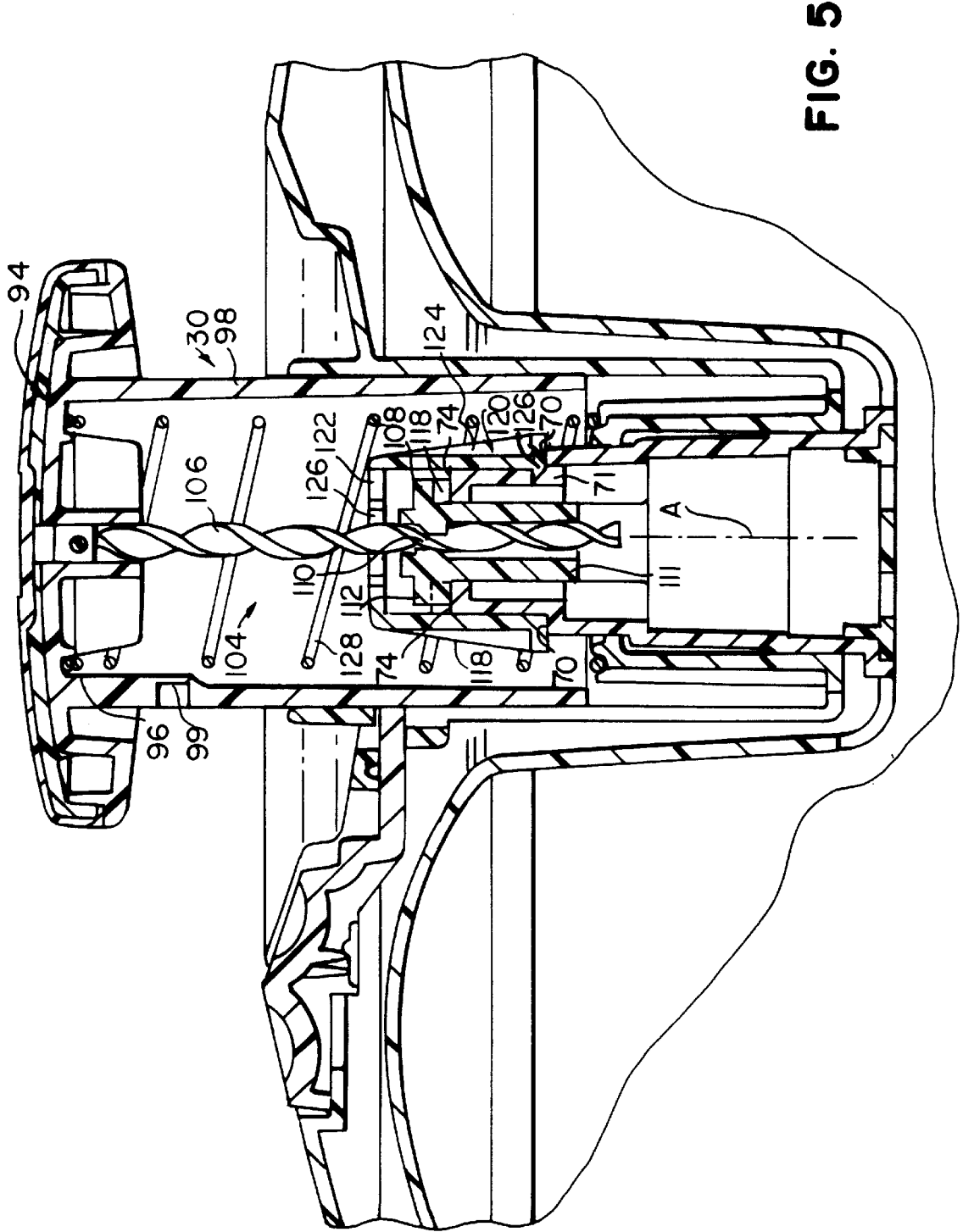
FIG. 5 is a sectional view similar to FIG. 4 illustrating the drive assembly in an engaged condition.

The lid 28 includes a convex annular surface portion 60 connected to the circular sidewall 56, a frustoconical shaped central portion 62 depending from the annular surface portion 60, a radially inwardly extending bottom surface portion 64 (FIG. 16) integral with the lower end of the frustoconical shaped surface portion 62 and a tubular, upwardly projecting portion 66 integral and coaxial with the bottom surface portion 64. The upwardly projecting portion 66 varies in diameter and has shoulder surfaces 68, 70 formed thereon. The upwardly projecting portion 66 also includes a slot 71 disposed above shoulder surface 70 (FIG. 5). Referring to FIG. 7, the upwardly projecting portion 66 has a terminal open end 72 having four inclined arcuate surfaces 73 and four axially extending engaging portions 74 forming, as discussed below, a portion of drive assembly 30. Referring to FIG. 3, a plug 75 closes the lower end of the upwardly projecting portion 66 to prevent food from entering the interior thereof.

Figure 4:
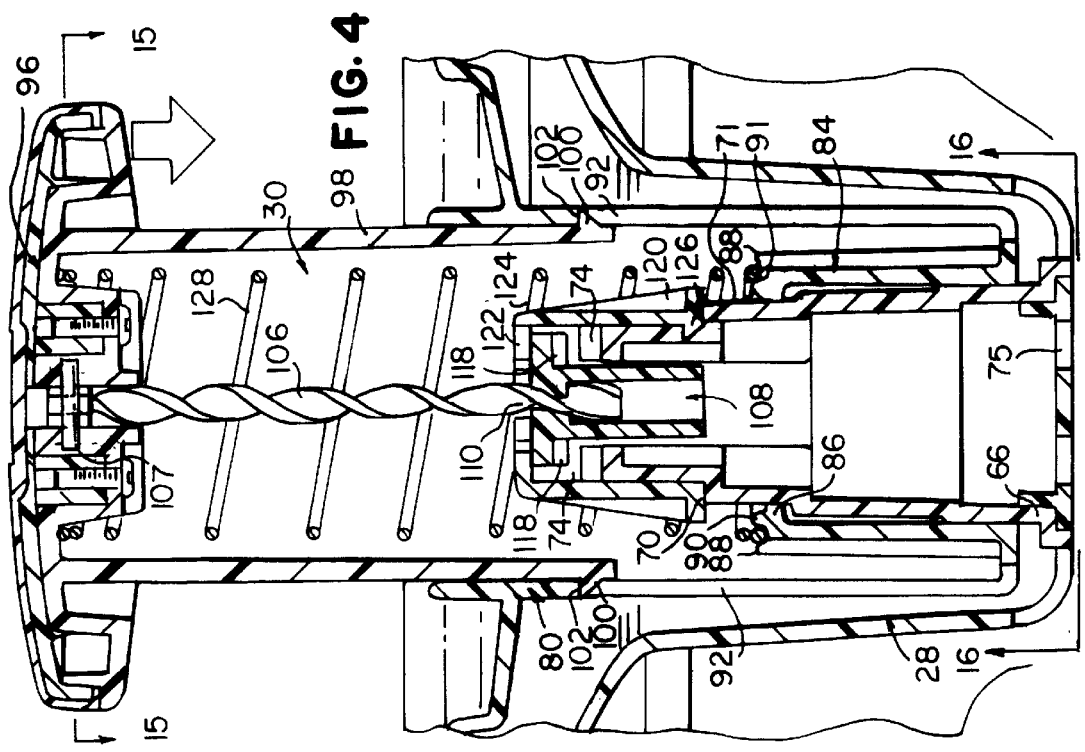
FIG. 4 is an enlarged, fragmentary sectional view taken generally along line 4—4 of FIG. 2, illustrating the drive assembly in a non-engaged condition.

As seen in FIG. 3, the cover 24 includes a cylindrical sidewall 76 having an outer diameter substantially equal to the inner diameter of the top edge 38 of the bowl 22 thereby forming a friction fit therebetween. The cover 24 also has an upper surface portion 78, a depending, substantially cylindrical central surface portion 80, an annular bottom surface portion 82 and a generally cylindrical upwardly projecting portion 84 disposable coaxially about a portion of the upwardly projecting portion 66 of the lid 28. The upwardly projecting portion 84 has a radially inturned end 86 at its upper end which abuts shoulder surface 68 of upwardly projecting portion 66. As seen in FIG. 4, the upwardly projecting portion 84 has a plurality of axial ribs 88 projecting radially outwardly therefrom. The upper ends of ribs 88 and portions 90 of the end 86 form a generally annular groove 91 therebetween.

As best seen in FIG. 4, the cylindrical surface portion 80, includes two vertical slots 92 disposed about 180 degrees apart and running the majority of the length of the cylindrical surface portion 80.

Referring to FIG. 5, the drive assembly 30 includes a linearly reciprocating handle structure 94 (or plunger assembly) moveable along vertical axis A. The reciprocating handle structure 94 includes a disc shaped upper end 96, or button structure, and a coaxial cylindrical sidewall 98 depending therefrom. The cylindrical sidewall 98 has a slot 99 adjacent to its upper end and, referring to FIG. 4, two radially outwardly extending projections 100 at its lower end, each forming a shoulder surface 102. The projections 100 are respectively disposed in the vertical slots 92 of the cylindrical surface portion 80 of the cover 24 for limiting upward axial movement and preventing rotation of the reciprocating handle structure 94 relative to the cover 24.

Referring to FIG. 5, the drive assembly 30 also includes a conversion mechanism 104 for converting the reciprocating movement of the handle structure 94 to rotary motion of the basket 26. The conversion mechanism 104 includes an elongated helical screw shaft 106 coaxial with the handle structure 94 and connected at one end to the disc shaped upper end 96, preferably by a pin 107 (FIG. 4). The elongated helical shaft 106 extends a slight distance below the lower end of the cylindrical sidewall 98.

Figure 17:
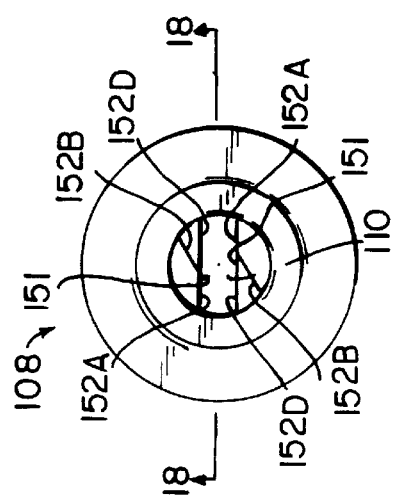
FIG. 17 is a top plan view of the nut of the drive assembly of FIG. 7.
Figure 18:
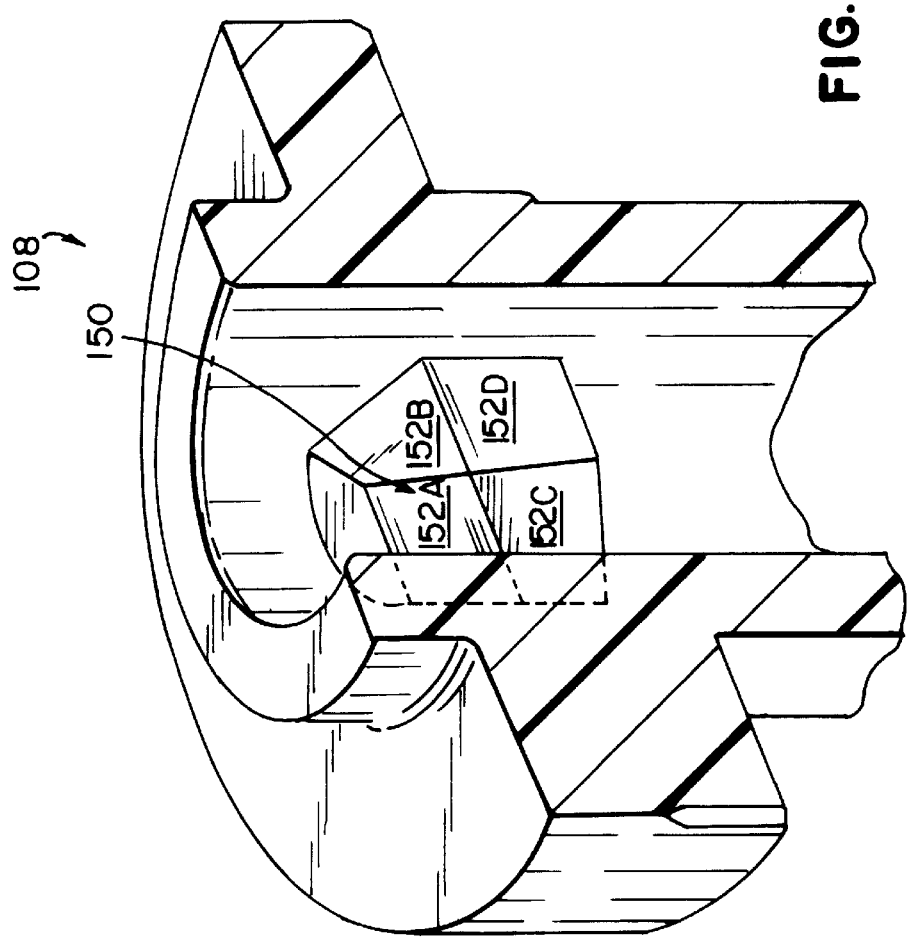
FIG. 18 is an enlarged, fragmentary, perspective sectional view taken generally along the line 18—18 of FIG. 17.

Referring to FIGS. 5 and 7, the conversion mechanism 104 also includes a nut 108 having a slot 110 shaped to receive the helical shaft 106 therethrough for screw-type engagement therewith. As seen best in FIGS. 17 and 18, the slot 110 is formed by two identical opposing spaced-apart faces 150, 151. Each face 150, 151 includes four quadrants 152A–D. Quadrants 152A and 152D are diagonally opposed and generally co-planar. Quadrants 152B and 152C are diagonally opposed and slope away from the same side of the plane of quadrants 152A and 152D. Quadrants 152A, 152B, 152C, 152D of face 150 respectively face quadrants 152B, 152A, 152D, 152C of face 151.

As seen in FIG. 7, the nut 108 also includes a tubular lower end 111 and a disc shaped upper portion 112 having a plurality of projections 114 depending therefrom. Each projection 114 includes an inclined arcuate surface 116 and an engaging portion 118. The conversion mechanism 104 also includes the engaging portions 74 of upwardly projecting portion 66 of the basket lid 28.

As seen in FIG. 4, the drive assembly 30 also includes a cap 120 having a top wall 122 and a substantially cylindrical sidewall 124. The substantially cylindrical sidewall 124 includes a radially inwardly extending projection 126 at its bottom end. The cap 120 is disposed about the terminal end 72 of the upwardly projecting portion 66 of the lid 28 above shoulder surface 70 and the projection 126 is disposed in slot 71 to maintain the cap 120 attached to upwardly projecting portion 66. As discussed below, the cap 120 limits the axial movement of the nut 108.

Referring to FIG. 4, the drive assembly 30 also includes a helical compression spring 128 seated in groove 91 of the upwardly projecting portion 84 and against the disc shaped upper portion 96 of the reciprocating handle structure 94.

Referring to FIGS. 3–6, the drive assembly 30 works as follows. FIGS. 3 and 4 illustrate the conversion mechanism 104 in a non-engaged normal rest condition where, as seen in FIG. 4, the engaging portions 118 of the nut 108 are spaced apart axially from the engaging portions 74 of the lid 28. The spring 128 biases the drive assembly 30 to this condition.

When downward force is applied to the disc shaped upper portion 96 of the reciprocating handle structure 94, the reciprocating handle structure 94, the attached helical shaft 106 and the nut 108 initially move together axially downwardly so that the engaging portions 118 of nut 108 contact associated engaging portions 74 of the lid 28 (FIG. 5). The conversion mechanism 104 is now in the engaged condition.

Continuing application of force in the same direction causes the helical shaft 106 to axially move through the slot 110 of the nut 108 to rotate the nut 108. This causes engaging portions 118 of the rotating nut 108 to contact the engaging portions 74 of the lid 28 to rotate the lid 28 and the perforated basket 26 coupled thereto about vertical axis A. The reciprocating handle structure 94 may be plunged down until the disc shaped upper end 96 contacts the top of the cylindrical surface portion 80 of the cover 24 (as in FIG. 6). When force is no longer applied, the spring 128 causes the reciprocating handle structure 94, the helical shaft 106 and the nut 108 to initially move axially upwardly together until the nut 108 contacts the top wall 122 of the cap 120 to stop further axial movement of the nut 108. The conversion mechanism 104 is now in its disengaged condition. The helical shaft 106 and the reciprocating handle structure 94, however, continue to move axially upward back to the position shown in FIG. 4. During this axial movement, the helical shaft 106 moves through the slot 110 of nut 108 causing it to rotate. Repeated plunging motions may be applied, as necessary, to rotate the basket 26 in which wet or washed food is placed. The rotation of the perforated basket 26 causes the liquid on the food to be sent out of the perforated basket 26 through apertures 46 by centrifugal force into the bowl 22, thereby drying the food in the basket.

In addition to the friction fit, described above, which couples the lid 28 to the basket 26, the ribs 44 of the perforated basket 26 and the ribs 58 of the lid 28 cooperate to ensure that the basket 26 rotates when the reciprocating handle structure 94 is plunged down. As seen in FIGS. 9 and 10, when the lid 28 is rotated, each rib 58 thereof can contact a rib 44 to rotate the perforated basket 26.

As seen in FIGS. 11–14, the salad spinner 20 also includes a stop mechanism 130 to prevent axial movement of the reciprocating handle structure 94. The stop mechanism 130 includes the slot 99 of the cylindrical sidewall 98 and a latch 132 supported by the cover 24.

Figure 6:
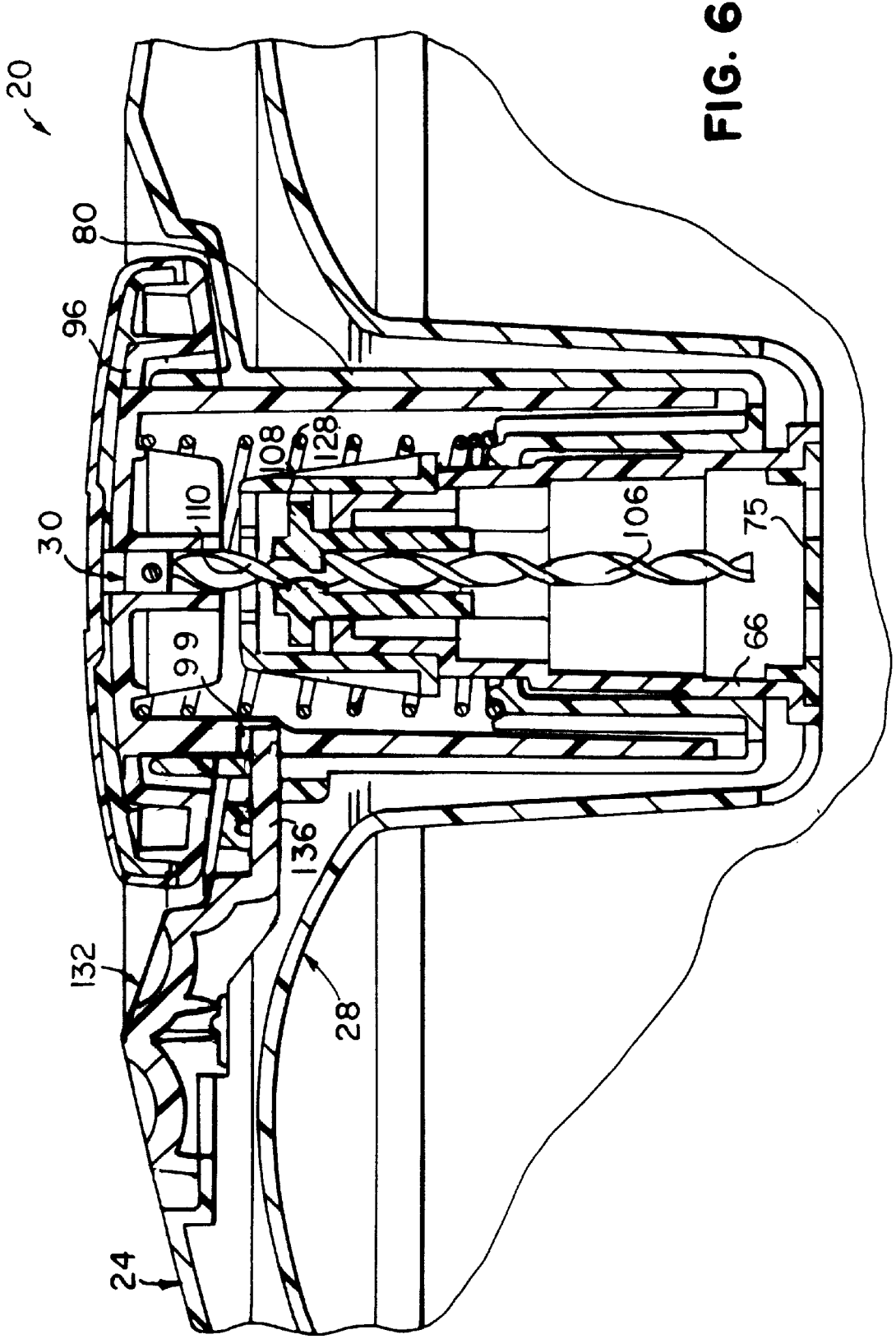
FIG. 6 is a view similar to FIG. 5, illustrating the drive assembly in a locked condition.

The latch 132 includes a central portion 134 terminating in a rectangular projection 136 and two laterally projecting legs 138 each, having a raised surface portion 140. As seen in FIGS. 6 and 12, when it is desired to prevent axial movement of the reciprocating handle structure 94, the handle structure 94 is fully depressed and the latch 132 is slid so that the projection 136 is placed in slot 99 of the reciprocating handle structure 94.

As seen best in FIGS. 13 and 14, the cover 24 includes two flexible walls 142 depending from the interior surface of the cover 24. The latch 132 is supported by the cover so that at least a portion of the raised surface portion 140 extends above the bottom of the flexible wall 142 which prevents the box-like projection 136 of latch 132 from accidentally moving out of (or into) the slot 99 without a force being applied to the latch 132 to cause the raised surface portions 140 to flex the flexible wall 142 to allow movement of the latch 132 under the flexible wall 142.

FIG. 19 illustrates a salad spinner 20' having an alternative basket embodiment. The spinner 20' is identical to spinner 20 of FIGS. 1–16 except that a post 200 is provided in the basket 26. The post 200 projects upwardly from the center of the perforated basket 26 and contacts the plug 75. The post 200 transfers vertical forces or load onto the center of the bowl 22 rather than through the lid 28 and perforated basket 26 which may cause them to flex, be damaged and cause the basket to flex causing components to interfere with each other to inhibit free rotation.

Alternatives to drive assembly 30 may also be used with the present invention. For example, the conversion mechanism of the drive assembly could include a gearing system wherein the linear reciprocating handle structure (or plunger assembly) may include a shaft having a vertically disposed gear rack. The gearing system would also include an annular gear rack disposed on or coupled to the lid 28 (and basket 26) and an intermediary primary gear coupling the vertical gear rack to the annular gear rack. When downward force is applied to the plunger assembly, the vertical gear rack engages the primary gear, which in turn engages the circular rack to rotate the lid and basket coupled thereto.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A device for drying food comprising:
    a bowl having a bottom wall and a sidewall terminating in a top edge;
    a cover removably connected to the top edge of the bowl;
    a perforated basket disposed in the bowl and rotatable about an axis; and
    a drive assembly carried by the cover and coupled to the basket for effecting rotation thereof, the drive assembly including a linearly reciprocating handle structure movable between a raised position and a lowered position and a conversion mechanism for converting reciprocating movement of the handle structure to rotary motion of the basket, wherein the conversion mechanism includes a lid substantially retained against axial movement, the lid releasably coupled to the basket and engageably coupled to the handle structure so that movement of the handle structure relative to the lid between the raised and lowered positions causes rotation of the lid and the basket; and
    biasing structure for biasing the handle toward the raised position.

2. The device of claim 1, wherein the biasing structure is disposed between the cover and the handle structure.

3. The device of claim 2, wherein the biasing structure includes a spring.

4. The device of claim 1, wherein the conversion mechanism includes a helical shaft coupled to the handle structure, a nut having a slot receiving the shaft therethrough engageable with the lid, wherein when the handle structure is moved in a direction from the raised position toward the lowered position the helical shaft passes through the slot to rotate the nut and the lid.

5. The device of claim 4, wherein the reciprocating handle structure includes a cylindrical sidewall coaxial with the shaft and a top wall closing the cylindrical sidewall at one end thereof and connected to the helical shaft.

6. The device of claim 1, and further comprising a stop mechanism to prevent movement of the reciprocating handle structure between the raised and lowered positions.

7. The device of claim 6, wherein the stop mechanism releasably maintains the handle structure in the lowered position.

8. The device of claim 1, wherein the handle structure is moveable along the axis.

9. A device for drying food comprising:
    a bowl having a bottom wall and a sidewall terminating in a top edge;
    a cover removably connected to the top edge of the bowl;
    a perforated basket having a bottom wall and a sidewall terminating at a top edge, the basket being disposed in the bowl and rotatable about an axis; and
    a drive assembly spaced from the bottom wall of the basket and carried by the cover and coupled to the basket for effecting rotation thereof, the drive assembly including a linearly reciprocating handle structure and a conversion mechanism for converting reciprocating movement of the handle structure to rotary motion of the basket, wherein the conversion mechanism includes a lid substantially retained against axial movement, the lid releasably coupled to the basket and engageably coupled to the handle structure so that movement of the handle structure relative to the lid causes rotation of the lid and the basket.

10. The device of claim 9, wherein the handle structure is moveable between raised and lowered positions, and further comprising biasing structure for biasing the handle toward the raised position.

11. A device for drying food comprising:

a bowl having a bottom wall and a sidewall terminating in a top edge;

a cover removably connected to the top edge of the bowl;

a perforated basket having a bottom wall and sidewall terminating at a top edge, the basket being disposed in the bowl and rotatable about an axis; and a drive assembly carried by the cover and coupled to the basket for effecting rotation thereof, the drive assembly including a linearly reciprocating handle structure and a conversion mechanism for converting reciprocating movement of the handle structure to rotary motion of the basket, wherein the conversion mechanism includes a lid substantially retained against axial movement, the lid releasably coupled to the basket and engageably coupled to the handle structure so that movement of the handle structure relative to the lid causes rotation of the lid and the basket, wherein the basket is devoid of structure in a storage region bounded by the sidewall and the bottom wall of the basket and a plane perpendicular to the axis and spaced well above the bottom wall of the basket.

12. The device of claim 11, wherein the handle structure is moveable between raised and lowered positions, and further comprising biasing structure for biasing the handle toward the raised position.

13. The device of claim 11, wherein the plane is disposed below the top edge of the basket a distance no more than about 75% of the axial height of the basket.

14. The device of claim 11, wherein the plane is disposed below the top edge of the basket a distance no more than about 50% of the axial height of the basket.

15. A device for drying food comprising:

a bowl having a bottom wall and a sidewall terminating in a top edge;

a cover removably connected to the top edge of the bowl;

a perforated basket disposed in the bowl and rotatable about an axis; and a drive assembly carried solely by the cover and coupled to the basket for effecting rotation thereof, the drive assembly including a linearly reciprocating handle structure and a conversion mechanism for converting reciprocating movement of the handle structure to rotary motion of the basket, wherein the conversion mechanism includes a lid substantially retained against axial movement, the lid releasably coupled to the basket and engageably coupled to the handle structure so that movement of the handle structure relative to the lid causes rotation of the lid and the basket.

16. The device of claim 15, wherein the top edge of the bowl defines an opening having an area, the cover lying substantially over the entire area of the opening of the bowl.

17. The device of claim 16, wherein the top edge of the basket defines an opening having an area, the lid lying substantially over the entire area of the opening of the basket.

18. The device of claim 15, wherein the handle structure is moveable between raised and lowered positions, and further comprising biasing structure for biasing the handle toward the raised position.

* * * * *